US012759816B2

(12) United States Patent
Kaphengst et al.

(10) Patent No.: US 12,759,816 B2
(45) Date of Patent: Oct. 13, 2026

(54) MATERIALS DELIVERY AND ASSEMBLY SYSTEM

(71) Applicant: GM Global Technology Operations LLC, Detroit, MI (US)

(72) Inventors: Michael R. Kaphengst, Leonard, MI (US); Alfred Manser, White Lake, MI (US); Ahmad Almarkhi, Farmington Hills, MI (US); Seog-Chan Oh, Troy, MI (US); Joshua Lee Solomon, Berkley, MI (US); Xiang Zhao, Novi, MI (US); Miguel Arturo Saez, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 312 days.

(21) Appl. No.: 18/493,265

(22) Filed: Oct. 24, 2023

(65) Prior Publication Data

US 2025/0128896 A1 Apr. 24, 2025

(51) Int. Cl.
*B65G 67/02* (2006.01)
*B65G 1/04* (2006.01)

(52) U.S. Cl.
CPC .......... *B65G 67/02* (2013.01); *B65G 1/0492* (2013.01); *B65G 2203/0266* (2013.01); *B65G 2203/042* (2013.01)

(58) Field of Classification Search
CPC ........ B65G 1/04; B65G 1/0492; B65G 1/137; B65G 7/00; B65G 7/02; B65G 7/04; B65G 7/23; B65G 2203/042; B65G 2203/0266

(Continued)

(56) References Cited

U.S. PATENT DOCUMENTS 7,305,287 B2 * 12/2007 Park .................... G05D 1/0289 318/587
8,761,989 B1 * 6/2014 Murphy .................. G05D 1/00 701/25

(Continued)

FOREIGN PATENT DOCUMENTS

CA 2883728 C * 12/2016 ............ B23P 21/004
CN 109676280 A * 4/2019 ............ B23K 31/02

(Continued)

OTHER PUBLICATIONS

English Translation of CN109676280A (Year: 2019).*

(Continued)

*Primary Examiner* — Terrell H Matthews
(74) *Attorney, Agent, or Firm* — Honigman LLP; Matthew H. Szalach

(57) ABSTRACT

A delivery and assembly system includes a plurality of storage locations including assembly materials and one or more vehicle transports including a controller. The vehicle transports are configured to transport the assembly materials. A control server is communicatively coupled with the controller of the one or more vehicle transports. The control server is configured to identify an available vehicle transport from the one or more vehicle transports and is configured to determine a fitness of the available vehicle transport to receive the assembly materials. An assembly station is configured to receive the available vehicle transport including the assembly materials.

20 Claims, 7 Drawing Sheets

(58) Field of Classification Search
USPC .......................................................... 414/273
See application file for complete search history.

(56) References Cited

U.S. PATENT DOCUMENTS

| | | | | |
|---|---|---|---|---|
| 10,933,933 | B2 | 3/2021 | Wells et al. | |
| 2017/0320102 | A1* | 11/2017 | McVaugh | B07C 5/38 |
| 2018/0276595 | A1* | 9/2018 | Gariepy | G06Q 10/06313 |
| 2020/0231185 | A1 | 7/2020 | Shiu et al. | |
| 2023/0145508 | A1 | 5/2023 | Kaphengst et al. | |

FOREIGN PATENT DOCUMENTS

| | | | | |
|---|---|---|---|---|
| DE | 102019114796 | A1 | 5/2020 | |
| DE | 102021102481 | A1 | 8/2022 | |
| WO | WO-2021252329 | A1 * | 12/2021 | B65G 1/0492 |

OTHER PUBLICATIONS

Kaphengst et al., "Systems and Methods for Configuring Plant Assembly Stations," U.S. Appl. No. 18/365,086, filed Aug. 3, 2023.
Kaphengst et al., "Systems to Use Autonomous Robot Ergonomic Swarm Ramps," U.S. Appl. No. 18/356,466, filed Jul. 21, 2023.

* cited by examiner

MATERIALS DELIVERY AND ASSEMBLY SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a materials delivery and assembly system.

Materials and tools are typically stored in warehouses and storage facilities prior to being assembled in vehicles. Retrieval of the materials may be achieved by various devices, such as a fork lift, that may be manually operated. Materials are typically delivered by trucks from which the materials are unloaded and stored in a warehouse or other storage facility until installation in a vehicle. Storage methods may result in delivery traffic and repeated reconfiguring of the materials to maintain available space of the materials.

SUMMARY

In some aspects, a materials delivery and assembly system includes a plurality of storage locations including assembly materials and one or more vehicle transports. The one or more vehicle transports include a controller. The one or more vehicle transports are configured to transport the assembly materials and to guide the one or more vehicle transports through an assembly process. A control server is communicatively coupled with the controller of the one or more vehicle transports and is configured to identify an available vehicle transport from the one or more vehicle transports. The control server is also configured to determine a fitness of the available vehicle transport to receive a first set of the assembly materials.

In some examples, the materials delivery and assembly system may include an assembly station configured to receive the available vehicle transport including the first set of the assembly materials. The control server may be configured to send a signal to the controller of the available vehicle transport corresponding to delivery of a second set of the assembly materials. Optionally, the control server may be configured to transmit coordinates to the controller of the available vehicle transport, and the available vehicle transport may be configured to autonomously travel between a holding station and the assembly station based on the coordinates received from the control server. In some instances, the available vehicle transport may be configured to have the assembly materials installed at one or more of the plurality of storage locations, and the controller of the available vehicle transport may be configured to transmit an installation signal to the control server in response to installation of the assembly materials.

In some configurations, the available vehicle transport may be configured to transport the assembly materials to the assembly station, and the assembly materials may be configured to be removed from the available vehicle transport at the assembly station. Optionally, the one or more vehicle transports may be autonomous vehicle transports, and the controller may be configured to detect objects around the one or more vehicle transports. In some instances, the control server may include an assembly time that may be associated with each vehicle transport of the one or more vehicle transports. The control server may be configured to identify the available vehicle transport based on the associated assembly time.

In another aspect, a delivery and assembly system includes a plurality of storage locations including assembly materials and one or more vehicle transports including a controller. The vehicle transports are configured to transport the assembly materials. A control server is communicatively coupled with the controller of the one or more vehicle transports. The control server is configured to identify an available vehicle transport from the one or more vehicle transports and is configured to determine a fitness of the available vehicle transport to receive the assembly materials. An assembly station is configured to receive the available vehicle transport including the assembly materials.

In some examples, the one or more vehicle transports may include a sensor skid operably coupled to the controller and may be configured to direct the available vehicle transport between a holding station, the plurality of storage locations, and the assembly station. In some instances, the fitness of the available vehicle transport may include an available size of the available vehicle transports. The control server may be configured to identify the available vehicle transport based on the available size. In some configurations, the plurality of storage locations may include a material storage location and a tool storage location. The material storage location may include one or more of a delivery vehicle, a shelving unit, and a warehouse. The available vehicle transport may be configured to have the assembly materials installed at the delivery vehicle of the material storage location.

In other instances, the available vehicle transport may be configured to have the assembly materials installed at one or more of the plurality of storage locations. The controller of the available vehicle transport may be configured to transmit a completion signal to the control server in response to installation of the assembly materials. In other examples, the controller may be configured to send a signal to the control server of the available vehicle transport corresponding to delivery of the assembly materials.

In yet other aspects, a delivery and assembly system includes a plurality of storage locations including assembly materials and one or more vehicle transports including a controller. The one or more vehicle transports are configured to transport the assembly materials. The controller including memory hardware that stores a capacity of the vehicle transport. A control server is communicatively coupled with the controller of the one or more vehicle transports. The control server is configured to identify an available vehicle transport from the one or more vehicle transports based on the capacity of the vehicle transport. The control server is configured to determine a fitness of the available vehicle transport to receive a first set of the assembly materials. An assembly station is configured to receive the available vehicle transport including the first set of the assembly materials.

In some examples, the controller of the one or more vehicle transports may be configured to determine a travel time between the plurality of storage locations and the assembly station. Optionally, the controller may be configured to send a delivery signal to the control server corresponding to retrieval and delivery of a second set of the assembly materials. The assembly station may include a first assembly station and a second assembly station. The available vehicle transport may be configured to deliver the first set of the assembly materials to the first assembly station and the second set of the assembly materials to the second assembly station. In some instances, the available vehicle transport may be configured to have the assembly materials installed at a respective one of the plurality of storage locations. The assembly materials may include a seat for the available vehicle transport.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
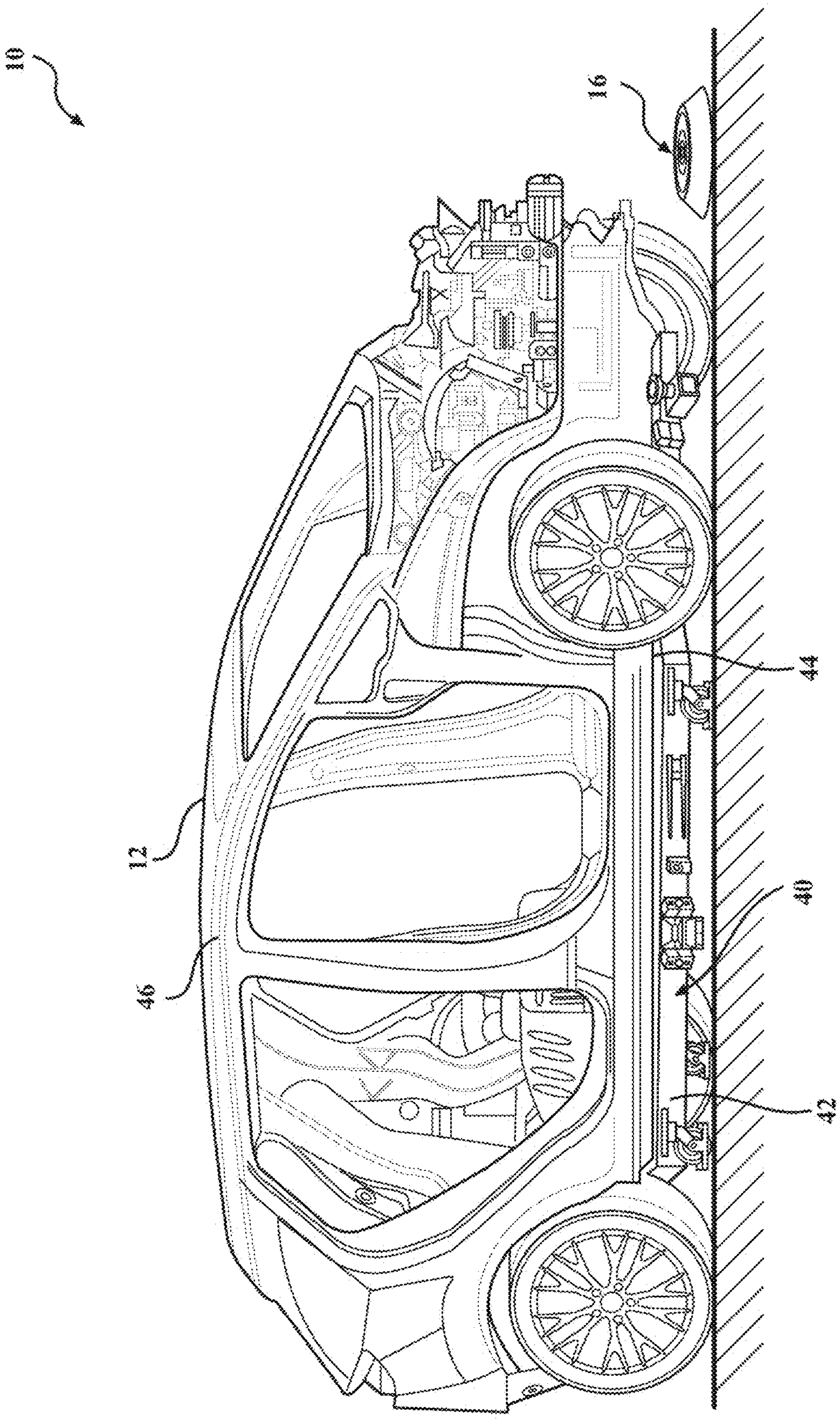
FIG. 1 is a perspective view of a vehicle transport according to the present disclosure.
Figure 2:
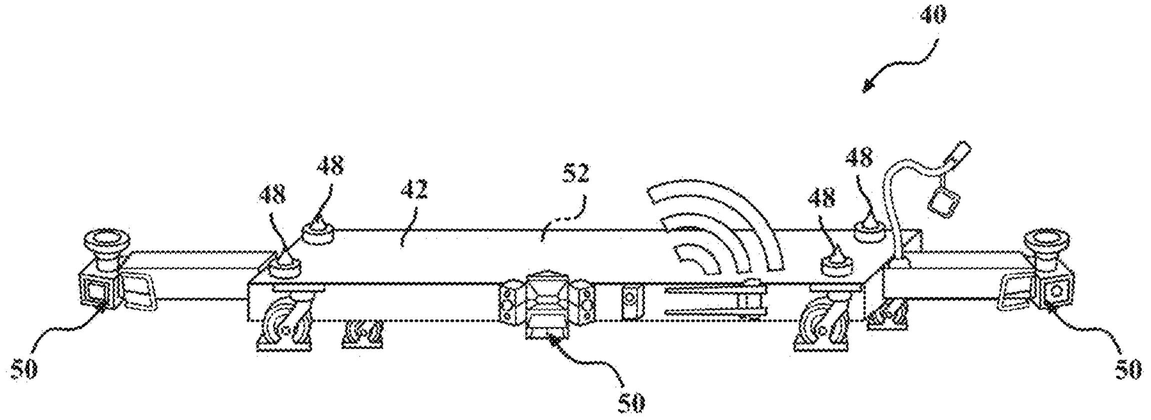
FIG. 2 is a perspective view of a sensor skid for a vehicle transport according to the present disclosure.
Figure 3:
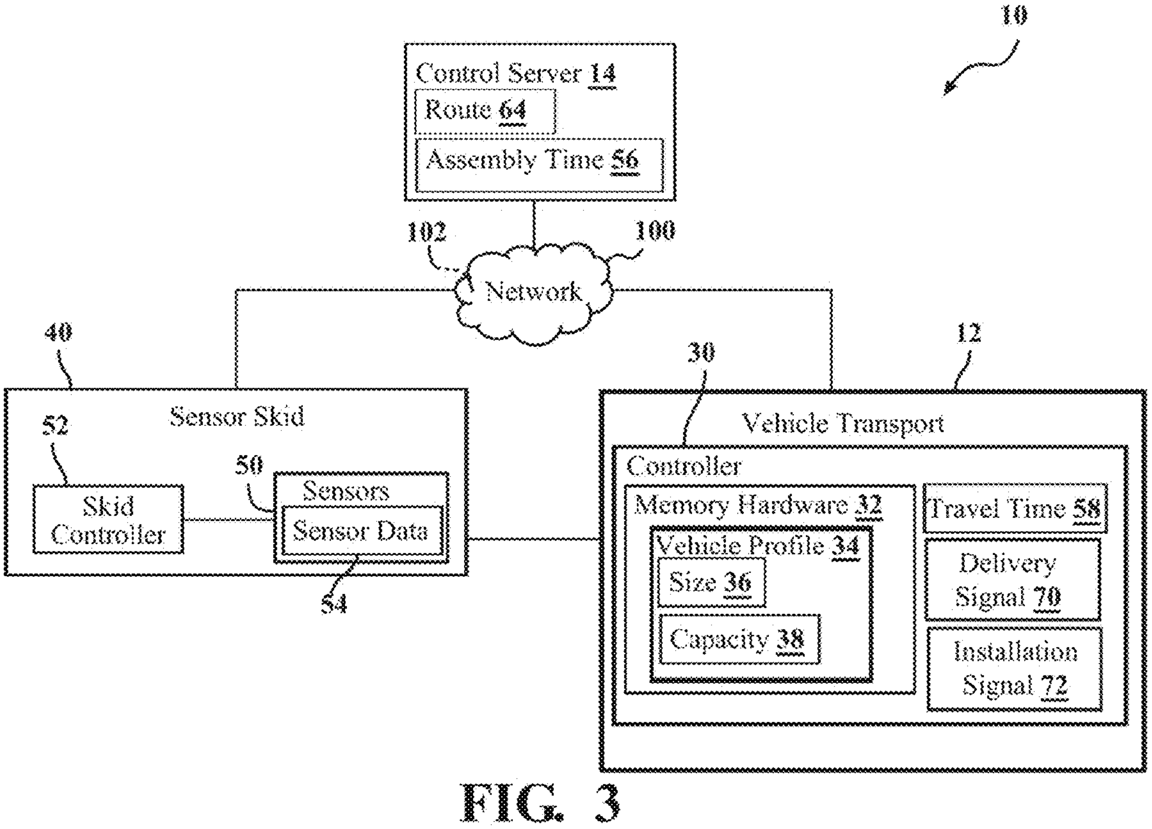
FIG. 3 is a functional block diagram for a materials delivery and assembly system according to the present disclosure.
Figure 4:
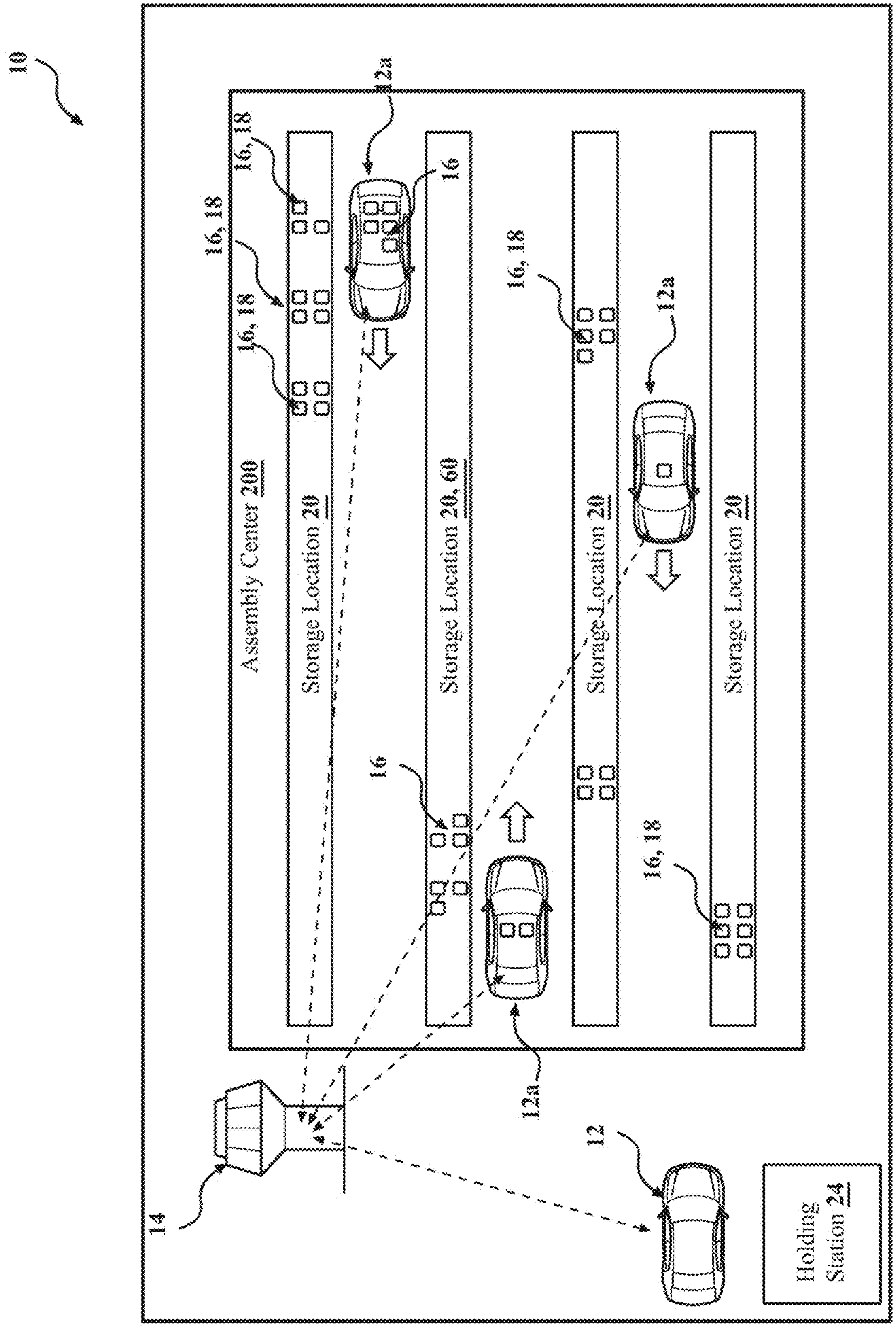
FIG. 4 is an example schematic of a materials delivery and assembly system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4, a materials delivery and assembly system 10 includes one or more vehicle transports 12 in communication with a control server 14 via a network 100. The delivery and assembly system 10 is configured for use in various assembly centers 200 at which various assembly materials 16 and/or tooling materials 18 may be delivered or otherwise stored. As described herein, the vehicle transports 12 are configured to transport the assembly materials 16 throughout the assembly centers 200 between storage locations 20 and an assembly station 22. Between transport of the assembly materials 16 and/or tooling materials 18, the vehicle transports 12 may be positioned at a holding station 24 until activated by the control server 14.

Each vehicle transport 12 includes a controller 30 that is configured with memory hardware 32. The memory hardware 32 stores a vehicle profile 34, which includes a size 36 and capacity 38 of the vehicle transport 12. The vehicle profiles 34 may be repeatedly updated throughout use of the vehicle transport 12 as various assembly materials 16 are added to and/or installed with the vehicle transport 12. Ultimately, the vehicle transports 12 are configured for assembly as vehicles via the delivery and assembly system 10. Prior to completion of assembly, the vehicle transports 12 are configured to assist in transporting the assembly materials 16 and tooling materials 18 to various locations within the respective assembly center 200. For example, the vehicle transports 12 are partially assembled vehicles.

The vehicle transports 12 may have autonomous capability and may optionally include a sensor skid 40 that may be configured to detect objects around the vehicle transports 12. The sensor skid 40 includes a skid body 42 coupled to an underside 44 of a body 46 of the vehicle transport 12 and also includes a plurality of pins 48 that selectively couple the skid body 42 to the underside 44 of the vehicle transport 12.

The sensor skid 40 may be selectively removed from the vehicle transport 12 via the plurality of pins 48. The sensor skid 40 includes a plurality of sensors 50 for detecting objects around the vehicle transports 12 and also includes a skid controller 52 in communication with the sensors 50 and the controller 30 of the vehicle transport 12. The sensors 50 are configured to generate sensor data 54 pertaining to the detected objects, which is communicated with the skid controller 52. The skid controller 52, in combination with the controller 30 of the vehicle transport 12, is configured to guide movement of the vehicle transport 12.

The vehicle transport 12 may utilize the sensor skid 40 when transporting the assembly materials 16 to the assembly station 22. The sensor skid 40 may be configured to guide the vehicle transports 12 through an assembly process, which transforms the vehicle transport 12 into an assembled vehicle. For example, the sensor skid 40 may be configured to direct the vehicle transport 12 between the holding station 24, the storage locations 20, and the assembly station(s) 22. The sensor skid 40 may be optionally removed after completion of assembly or may alternatively be maintained as part of the assembled vehicle.

With further reference to FIGS. 1-4, the controller 30 of the vehicle transport 12 is communicatively coupled with the control server 14. The control server 14 is configured to identify an available vehicle transport 12*a* from the one or more vehicle transports 12 and determine a fitness of the available vehicle transport 12*a* to receive the assembly materials 16. For example, the control server 14 may query, via the network 100, the vehicle profile 34 from the controller 30. The vehicle profile 34 may indicate the capacity 38 and/or size 36 of the vehicle transport 12, which may assist in the control server 14 determining which vehicle transport 12 is available to transport various assembly materials 16. Further, the control server 14 may determine the size of the assembly materials 16 and/or the tooling materials 18 that may be delivered or otherwise transported by the vehicle transport 12. The size of the assembly materials 16 and the tooling materials 18 in comparison with the size 36 and the capacity 38 of the vehicle transport 12 may affect the selection of the available vehicle transport 12*a*.

For example, the control server 14 may select an available vehicle transport 12*a* based on an increased capacity 38 as compared with other vehicle transports 12. The availability of the vehicle transports 12 may depend on the transportation job defined by the control server 14, such that an increased capacity 38 may be advantageous to transport large assembly materials 16 as compared to a lower capacity 38 that may be utilized to transport small assembly materials 16. Stated differently, the control system 14 identifies the fitness of the available vehicle transport 12*a* including the available size 36 of the available vehicle transport 12*a* and is configured to select the available vehicle transport 12*a* based on the available size 36.

The assembly stations 22 are configured to receive the assembly materials 16 from the available vehicle transport 12*a* ahead of assembling a vehicle. It is contemplated that in some examples, multiple assembly stations 22 may be utilized for various stages of vehicle assembly and may receive different assembly materials 16. For example, a first assembly station 22*a* may receive a first set 16*a* of assembly materials 16 and a second assembly station 22*b* may receive a second set 16*b* of assembly materials 16. The first set 16*a* and the second set 16*b* may contain the same or different assembly materials 16 depending on the assembly configuration of each of the assembly stations 22*a*, 22*b*. The control server 14 communicates with the controller 30 of the respective vehicle transport 12 to indicate a respective one or more storage locations 20 and which of the assembly materials 16 to collect. For example, the control server 14 may send a signal to the controller 30 of the available vehicle transport 12 corresponding to delivery of the assembly materials 16.

The control server 14 includes an assembly time 56, which is associated with each vehicle transport 12. For example, the vehicle transports 12 may be in various stages of assembly, such that each vehicle transport 12 may have a different assembly time 56 based on the current assembly stage. The control server 14 may identify the available vehicle transport 12*a* based on the assembly time 56. Further, the controller 30 is configured to determine a travel time 58 between each of the storage locations 20, the assembly stations 22, and a current location of the vehicle transport 12 to maximize the efficiency of the delivery and assembly system 10. For example, the control server 14 may identify the available vehicle transport 12*a* based on the travel time 58 to identify the closest vehicle transport 12 to the target assembly materials 16. It is also contemplated that the control server 14 may utilize each of the vehicle profile 34, the assembly time 56, and the travel time 58 to assess and identify the available vehicle transport 12*a*. The identified available vehicle transport 12*a* may change depending on each of the vehicle profile 34, the assembly time 56, and the travel time 58 and depending on the assembly materials 16 and/or tooling materials 18 to be transported by the vehicle transports 12.

Referring now to FIGS. 3-6, in some examples, the control server 14 may transmit coordinates to the controller 30 corresponding to the storage location 20 of the assembly materials 16. The available vehicle 12*a* may, in response to receiving the coordinates, autonomously travel via the controller 30 between the holding station 24 and the assembly station 22 to transport the assembly materials 16, as described in more detail below. The storage locations 20 may include a material storage location 60 and a tool storage location 62. The material storage location 60 may include, but is not limited to, shelving units, a warehouse, truck beds, and any other practicable storage location. Once the storage location 20 is identified by the control server 14, the control server 14 may identify a route 64 for the vehicle transport 12. The control server 14 takes into consideration the travel time 58 of the selected available vehicle transport 12*a* in determining the route 64. The control server 14 may also determine whether the vehicle transport 12 will wait at the storage location 20 for the assembly materials 16.

If the control server 14 determines that the travel time 58 is less than the anticipated wait time, then the control server 14 may elect a different vehicle transport 12 or may elect to wait to deploy the vehicle transport 12 until the wait time is less than the anticipated travel time 58. The control server 14 may continuously compare each of the vehicle transports 12 to identify the available vehicle transport 12*a* that has a minimal wait time and also has the available capacity 38 to receive the assembly materials 16 and/or the tooling materials 18. Although described herein with particular reference to the assembly materials 16, it is contemplated that the vehicle transports 12 may also repeatedly transport the tooling materials 18 between storage locations 20 and the assembly stations 22. For example, the vehicle transport 12 may transport both the assembly materials 16 and the tooling materials 18 that may be utilized during installation of the respective assembly materials 16. Thus, the vehicle transports 12 may be utilized to maximize the efficiency of vehicle assembly.

Figure 5:
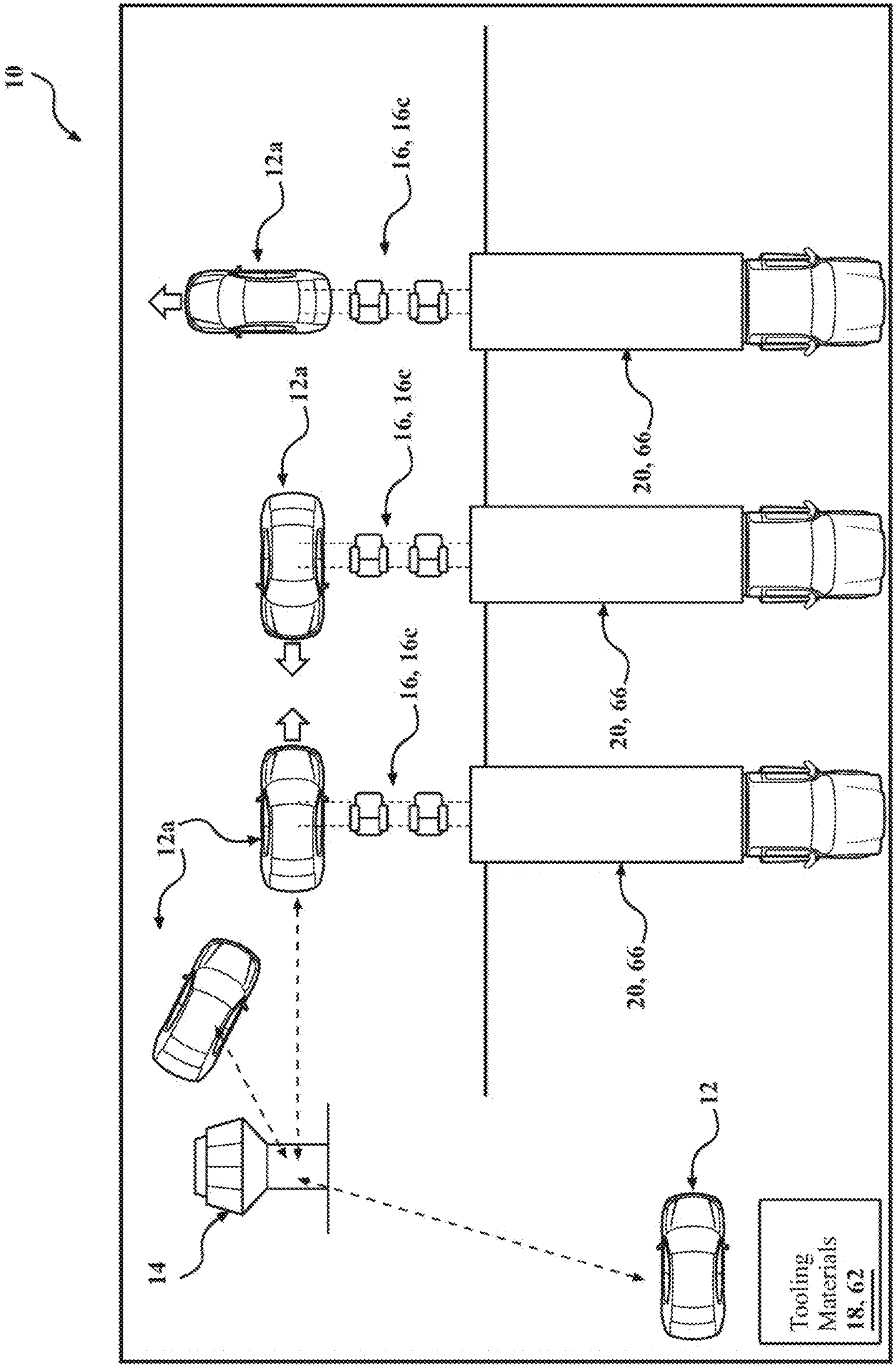
FIG. 5 is another example schematic of a materials delivery and assembly system according to the present disclosure.
Figure 6:
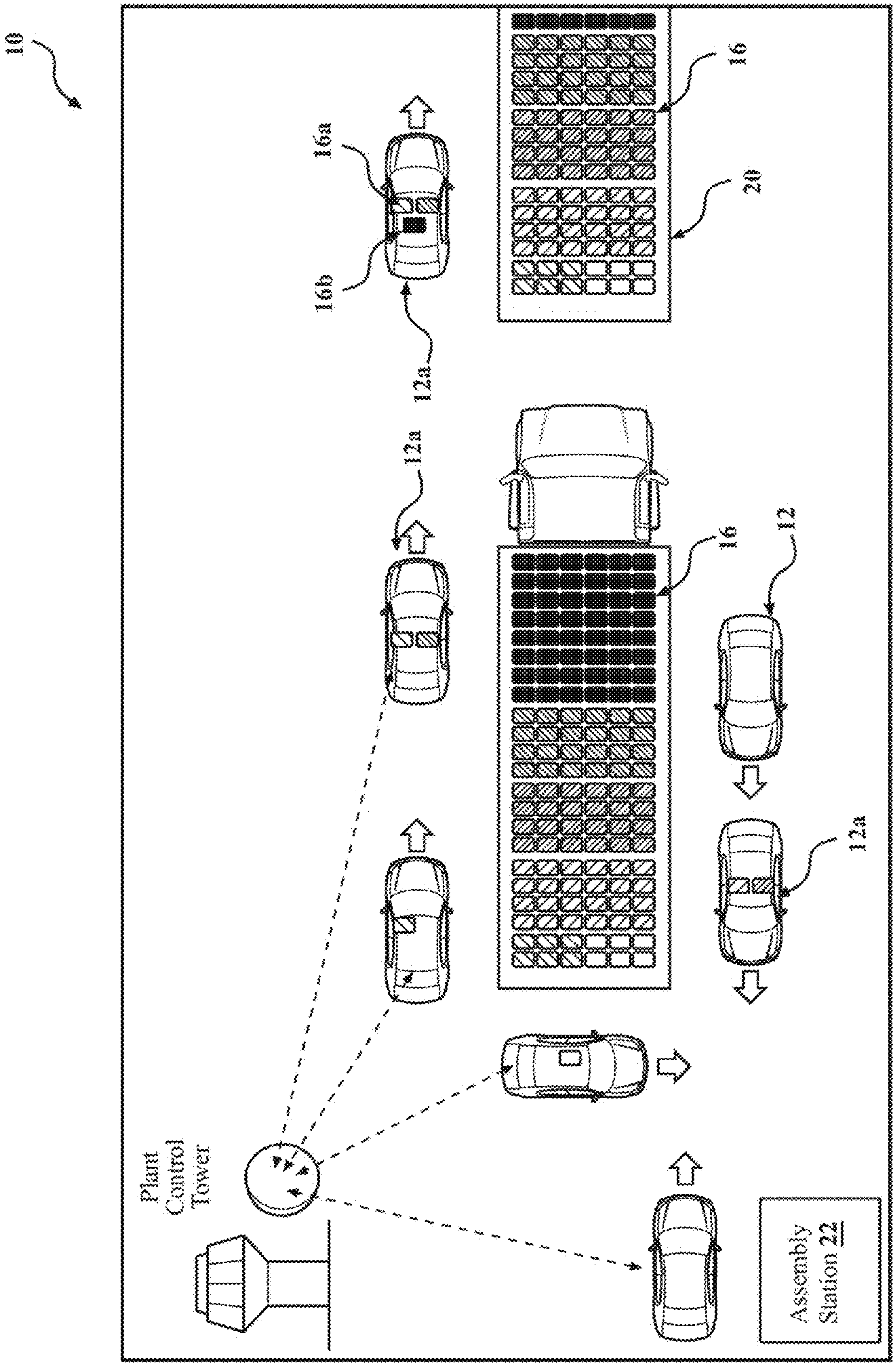
FIG. 6 is yet another example schematic of a materials delivery and assembly system according to the present disclosure.

The illustrated examples in FIGS. 5 and 6 depict the vehicle transports 12 collecting the assembly materials 16 from delivery vehicles 66. In these examples, the vehicle transports 12 advantageously assist in minimizing the overall on-site storage space by unloading assembly materials 16 for installation from the delivery vehicle 66. Prior to collecting the assembly materials 16 for install, the vehicle transports 12 may first collect the respective tooling materials 18 that may be utilized to install the assembly materials 16 at the storage location 20. It is particularly advantageous to install large or otherwise cumbersome assembly materials 16 at the storage location 20 to minimize the amount of manual manipulation, storage, or additional transport of the large assembly materials 16.

For example, the assembly materials 16 may include a seat 16*c* for the vehicle transport 12 that may be installed upon removal from the delivery vehicle 66. The control server 14 may receive, via the network 100, data pertaining to the assembly materials 16 on each of the delivery vehicles 66 and may activate the available vehicle transport 12*a* that is configured to have the assembly materials 16 stored in the delivery vehicle 66 installed. Thus, the available vehicle transport 12*a* may have the assembly materials 16 installed at the storage location 20. In other examples, the available vehicle transport 12*a* receives the assembly materials 16 and has assembly materials 16 separately installed at the assembly station 22.

The controller 30 may send a delivery signal 70 to the control server 14 corresponding to delivery of the assembly material 16. It is also contemplated that the controller 30 may transmit, via the network 100, an installation signal 72 to the control server 14. The installation signal 72 may correspond to the installation of one or more assembly materials 16 with the vehicle transport 12. For example, the activated available vehicle transport 12*a* may have one or more assembly materials 16 installed at the storage location(s) 20, and the controller 30 transmits the installation signal 72 to the control server 14 in response to the completed installation. As mentioned above, some of the assembly materials 16 are large, such that it is advantageous to install the large assembly materials 16 directly into the available vehicle transport 12*a* at the storage location 20.

Figure 7:
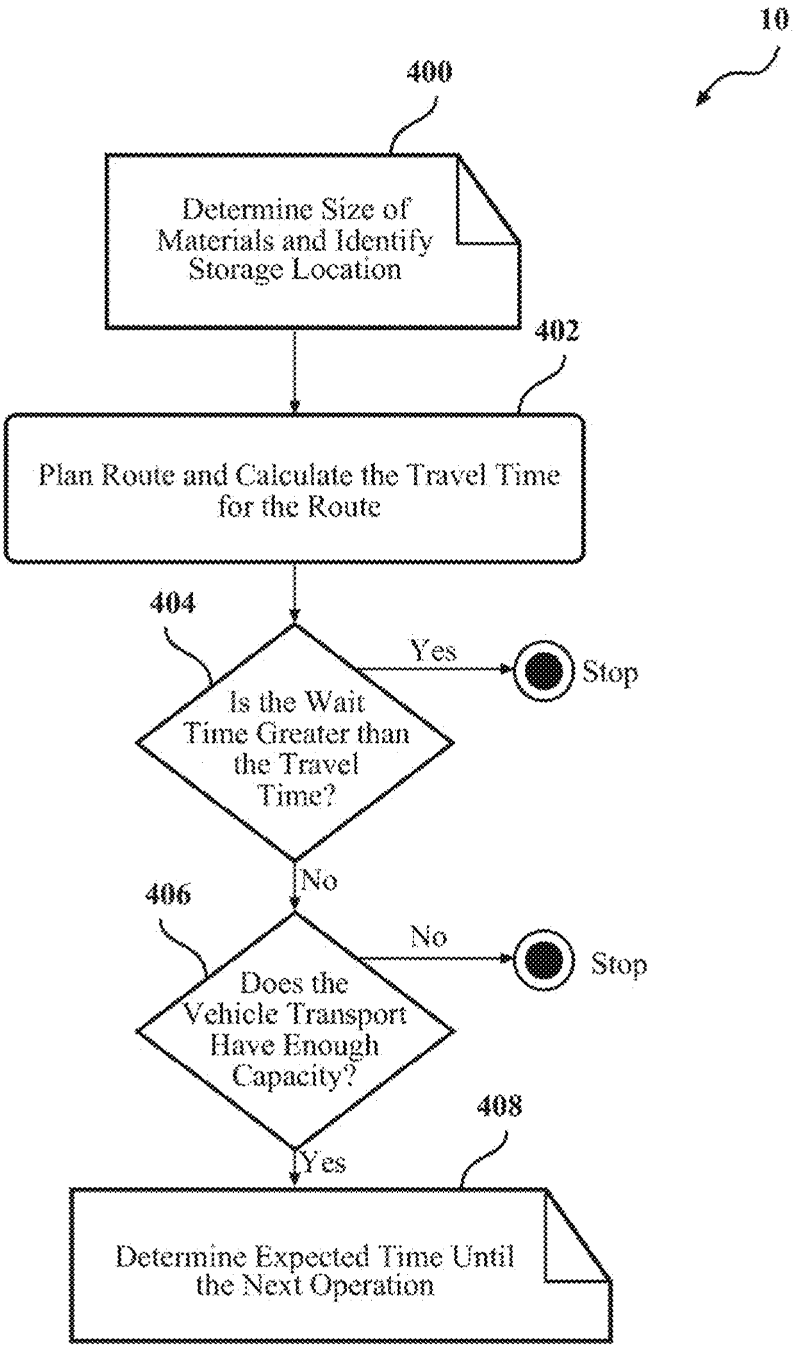
FIG. 7 is an example flow diagram of a materials delivery and assembly system according to the present disclosure.
Figure 8:
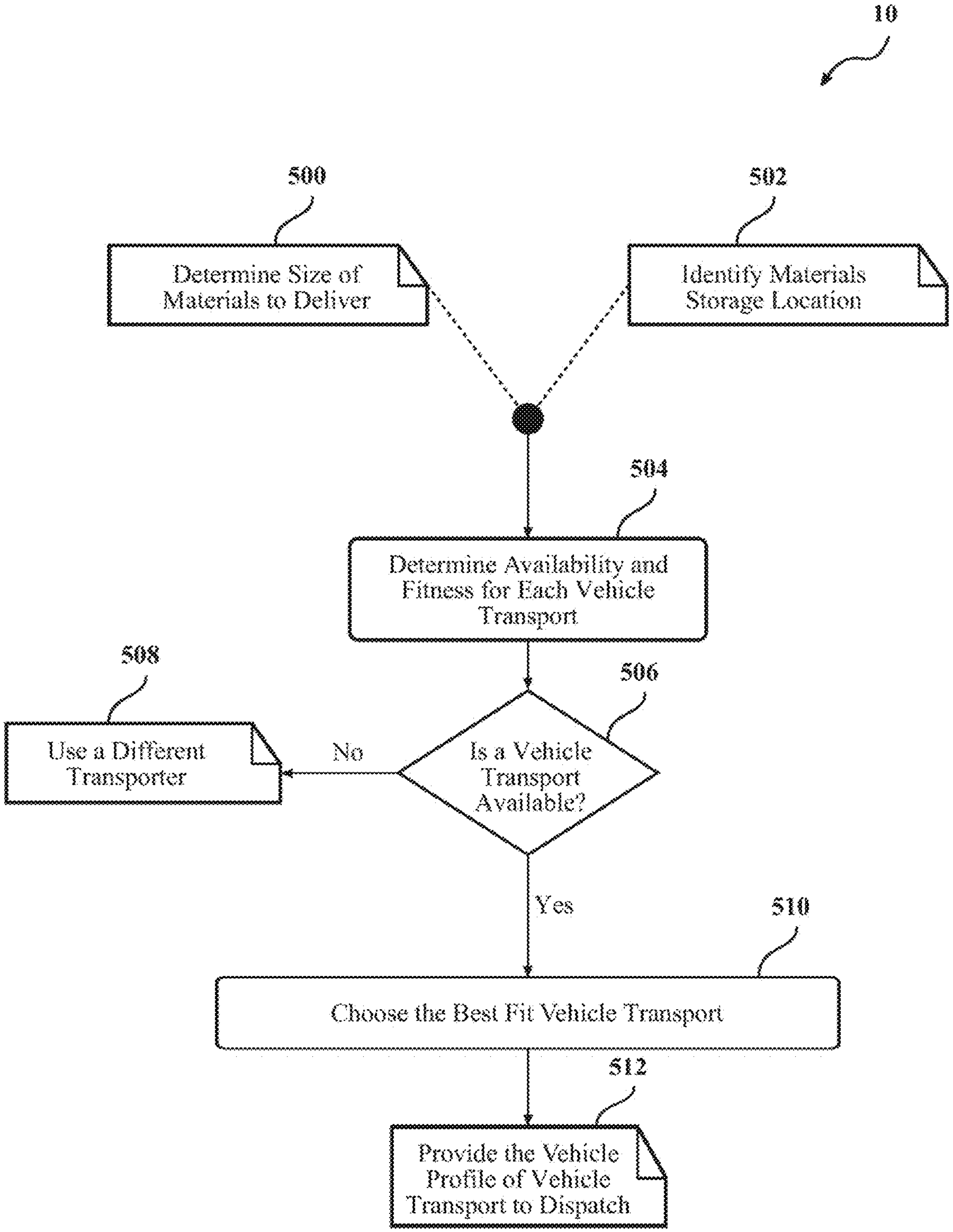
FIG. 8 is an example flow diagram of the materials delivery and assembly system of FIG. 7.

With specific reference to FIGS. 7 and 8, an example flow diagram of the materials delivery and assembly system 10 is provided. At 400, the control server 14 identifies a size of the assembly materials 16 and/or the tooling materials 18 to be delivered and identifies the storage location 20 at which the respective assembly materials 16 and/or tooling materials 18 are stored. The control server 14, at 402, determines a route 64 for a vehicle transport 12 and calculates the anticipated travel time 58 for the vehicle transport 12 along the route 64. The control server 14, at 404, determines whether a waiting time of the vehicle transport 12 at the storage location 20 would be greater than the travel time 58. If the waiting time exceeds the travel time 58, then the control server 14 may stop the activation of the vehicle transport 12 or may identify a different vehicle transport 12. If the travel time 58 exceeds the anticipated waiting time, then the control server 14, at 406, determines whether the vehicle transport 12 has sufficient capacity 38 to receive the assembly material 16. If there is sufficient capacity 38, then the control server 14, at 408, identifies a subsequent operation. The subsequent operation may include activating the available vehicle transport 12*a* for retrieval of the assembly materials 16, initiating an installation procedure for installation of the assembly materials 16 upon retrieval, and identifying additional available vehicle transports 12*a* for retrieval of additional assembly materials 16.

In another example flow diagram of the materials delivery and assembly system 10, the control server 14, at 500, determines the size of the assembly materials 16 and/or the tooling materials 18 to be transported and, at 502, identifies the storage location 20 of the respective assembly materials 16 and/or tooling materials 18. The control server 14, at 504, queries the controller 30 of each vehicle transport 12 for the respective availability and fitness of the vehicle transport 12 based on the identified assembly materials 16 and/or tooling materials 18. Based on the vehicle profiles 34 received from the controllers 30, the control server, at 506, determines whether there is an available vehicle transport 12*a*.

If the vehicle profiles 34 do not support the assembly materials 16 and/or the tooling materials 18 identified, then the control server 14, at 508, may utilize an alternate transporter. For example, an alternate transporter may include, but is not limited to, a forklift, a cart, and any other practicable transporter. If one or more of the vehicle profiles 34 support the identified assembly materials 16 and/or tooling materials 18, then the control server 14, at 510, identifies the vehicle transport 12 with the highest fitness match as the available vehicle transport 12*a*. As described herein, the highest fitness match corresponds to the vehicle transport 12 with sufficient capacity 38 and size 36 to receive the identified assembly materials 16 and/or tooling materials 18. Once the available vehicle transport 12*a* is identified, then the control server 14, at 512, transmits the vehicle profile 34 of the identified available vehicle transport 12*a* to a dispatch 102 for the delivery and assembly system 10.

Referring again to FIGS. 1-8, the delivery and assembly system 10 advantageously assists in retrieval of assembly materials 16 and tooling materials 18 during assembly of vehicles. The vehicle transports 12 autonomous navigation to the storage locations 20 minimize additional expenditure to locate and haul the assembly materials 16 and tooling materials 18 back to the assembly station 22. Rather, the vehicle transports 12 are configured to efficiently retrieve the assembly materials 16 for installation. In some instances, the assembly materials 16 may be readily installed in the vehicle transports 12 at the storage locations 20, which facilitates efficient storage and unloading from delivery vehicles 66. The vehicle transports 12 may be continuously used as part of the delivery and assembly system 10 even after installation of assembly materials 16. It is contemplated that the control server 14 may identify a completion point based on the assembly materials installed in the vehicle transports 12. The completion point identified by the control server 14 may correspond to a point when the vehicle transports 12 may be phased out of the delivery and assembly system 10 and prepare for final vehicle assembly.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A materials delivery and assembly system comprising:
a plurality of storage locations including assembly materials;
one or more vehicle transports including a controller configured to guide movement of the one or more vehicle transports, the one or more vehicle transports being configured to transport the assembly materials and to guide the one or more vehicle transports through an assembly process, the one or more vehicle transports each being a partially assembled vehicle configured to have one or more of the assembly materials installed to the partially assembled vehicle; and
a control server communicatively coupled with the controller of the one or more vehicle transports, the control server being configured to identify an available vehicle transport from the one or more vehicle transports and being configured to determine a fitness of the available vehicle transport to receive a first set of the assembly materials.

2. The materials delivery and assembly system of claim 1, further including an assembly station configured to receive the available vehicle transport including the first set of the assembly materials, the control server being configured to send a signal to the controller of the available vehicle transport corresponding to delivery of a second set of the assembly materials.

3. The materials delivery and assembly system of claim 2, wherein the control server is configured to transmit coordinates to the controller of the available vehicle transport, the available vehicle transport being configured to autonomously travel between a holding station and the assembly station based on the coordinates received from the control server.

4. The materials delivery and assembly system of claim 3, wherein the available vehicle transport is configured to have the assembly materials installed at one or more of the plurality of storage locations, the controller of the available vehicle transport being configured to transmit an installation signal to the control server in response to installation of the assembly materials.

5. The materials delivery and assembly system of claim 2, wherein the available vehicle transport is configured to transport the assembly materials to the assembly station, the assembly materials being configured to be removed from the available vehicle transport at the assembly station.

6. The materials delivery and assembly system of claim 1, wherein the one or more vehicle transports are autonomous vehicle transports and the controller is configured to detect objects around the one or more vehicle transports.

7. The materials delivery and assembly system of claim 1, wherein the control server includes an assembly time associated with each vehicle transport of the one or more vehicle transports, the control server being configured to identify the available vehicle transport based on the associated assembly time.

8. A delivery and assembly system comprising:
a plurality of storage locations including assembly materials;
one or more vehicle transports including a controller configured to guide movement of the one or more vehicle transports, the one or more vehicle transports being configured to transport the assembly materials, the one or more vehicle transports each being a partially assembled vehicle configured to have one or more of the assembly materials installed to the partially assembled vehicle;
a control server communicatively coupled with the controller of the one or more vehicle transports, the control server being configured to identify an available vehicle transport from the one or more vehicle transports and being configured to determine a fitness of the available vehicle transport to receive the assembly materials; and
an assembly station configured to receive the available vehicle transport including the assembly materials.

9. The delivery and assembly system of claim 8, wherein the one or more vehicle transports include a sensor skid operably coupled to the controller and configured to direct the available vehicle transport between a holding station, the plurality of storage locations, and the assembly station.

10. The delivery and assembly system of claim 8, wherein the fitness of the available vehicle transport includes an available size of the available vehicle transport, the control server being configured to identify the available vehicle transport based on the available size.

11. The delivery and assembly system of claim 8, wherein the plurality of storage locations include a material storage location and a tool storage location, the material storage location including one or more of a delivery vehicle, a shelving unit, and a warehouse.

12. The delivery and assembly system of claim 11, wherein the available vehicle transport is configured to have the assembly materials installed at the delivery vehicle of the material storage location.

13. The delivery and assembly system of claim 8, wherein the available vehicle transport is configured to have the assembly materials installed at one or more of the plurality of storage locations, the controller of the available vehicle transport being configured to transmit an installation signal to the control server in response to installation of the assembly materials.

14. The delivery and assembly system of claim 8, wherein the controller is configured to send a signal to the control server of the available vehicle transport corresponding to delivery of the assembly materials.

15. A delivery and assembly system comprising:
a plurality of storage locations including assembly materials;
one or more vehicle transports including a controller configured to guide movement of the one or more vehicle transports, the one or more vehicle transports being configured to transport the assembly materials, the one or more vehicle transports each being a partially assembled vehicle configured to have one or more of the assembly materials installed to the partially assembled vehicle, the controller including memory hardware that stores a capacity of the one or more vehicle transports;
a control server communicatively coupled with the controller of the one or more vehicle transports, the control server being configured to identify an available vehicle transport from the one or more vehicle transports based on the capacity of the vehicle transport and being configured to determine a fitness of the available vehicle transport to receive a first set of the assembly materials; and
an assembly station configured to receive the available vehicle transport including the first set of the assembly materials.

16. The delivery and assembly system of claim 15, wherein the controller of the one or more vehicle transports is configured to determine a travel time between the plurality of storage locations and the assembly station.

17. The delivery and assembly system of claim 15, wherein the controller is configured to send a delivery signal to the control server corresponding to retrieval and delivery of a second set of the assembly materials.

18. The delivery and assembly system of claim 17, wherein the assembly station includes a first assembly station and a second assembly station, the available vehicle transport being configured to deliver the first set of the assembly materials to the first assembly station and the second set of the assembly materials to the second assembly station.

19. The delivery and assembly system of claim 15, wherein the available vehicle transport is configured to have the assembly materials installed at a respective one of the plurality of storage locations.

20. The delivery and assembly system of claim 19, wherein the assembly materials include a seat for the available vehicle transport.

* * * * *